US012093063B2

(12) United States Patent
Jimbo et al.

(10) Patent No.: US 12,093,063 B2
(45) Date of Patent: Sep. 17, 2024

(54) CONTROL SYSTEM FOR MONITORING CONTROL STATE OF TARGET DEVICE

(71) Applicant: OMRON Corporation, Kyoto (JP)

(72) Inventors: Ryuichi Jimbo, Kusatsu (JP); Takao Uemura, Kusatsu (JP); Masakazu Matsugami, Ritto (JP); Takaya Kitano, Kyoto (JP); Fumiaki Sato, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 761 days.

(21) Appl. No.: 17/286,852

(22) PCT Filed: Nov. 7, 2019

(86) PCT No.: PCT/JP2019/043728
§ 371 (c)(1),
(2) Date: Apr. 20, 2021

(87) PCT Pub. No.: WO2020/110653
PCT Pub. Date: Jun. 4, 2020

(65) Prior Publication Data
US 2021/0382504 A1 Dec. 9, 2021

(30) Foreign Application Priority Data
Nov. 28, 2018 (JP) .................................. 2018-222846

(51) Int. Cl.
*G05D 3/12* (2006.01)
(52) U.S. Cl.
CPC ....................................... *G05D 3/12* (2013.01)
(58) Field of Classification Search
None
See application file for complete search history.

(56) References Cited

U.S. PATENT DOCUMENTS 5,757,178 A * 5/1998 Luehrs .................... G01P 3/489
340/936
5,870,488 A * 2/1999 Rush ................. H01L 21/67271
382/287

(Continued)

FOREIGN PATENT DOCUMENTS

CN 101340171 A 1/2009
CN 102195555 A 9/2011

(Continued)

OTHER PUBLICATIONS

International Search Report issued in Intl. Appln. No. PCT/JP2019/043728 mailed Jan. 28, 2020. English translation provided.

(Continued)

*Primary Examiner* — Santosh R Poudel
(74) *Attorney, Agent, or Firm* — ROSSI, KIMMS & McDOWELL LLP (57) ABSTRACT

A control system for monitoring a control state of a target device that receives drive control by a motor includes a setting unit that sets an origin for position monitoring of the target device and a sensor that detects the target device reaching a predetermined position. The setting unit includes an obtainer that obtains, under predetermined drive control over the target device by the motor, leading and trailing edges in a detection signal from the sensor in response to the target device reaching the predetermined position, and a calculator that calculates the origin using first position information associated with a target device position and calculated based on the leading and trailing edges in the detection signal and second position information associated with the target device position and different from the first position information.

9 Claims, 8 Drawing Sheets

(56) References Cited

U.S. PATENT DOCUMENTS

| | | | |
|---|---|---|---|
| 6,118,517 A * | 9/2000 | Sasaki | G03F 1/70 355/53 |
| 2005/0057656 A1* | 3/2005 | Chardon | H04N 23/51 348/E5.026 |
| 2009/0033030 A1* | 2/2009 | Yasumoto | G03G 15/6564 271/278 |
| 2010/0250010 A1* | 9/2010 | Ferrara | G01N 25/4866 374/31 |
| 2011/0221377 A1 | 9/2011 | Ueno | |
| 2012/0191238 A1* | 7/2012 | Sakai | G05B 19/404 700/189 |
| 2013/0043415 A1* | 2/2013 | Misao | G03G 15/6567 250/559.15 |
| 2014/0070752 A1 | 3/2014 | Otsuji et al. | |
| 2015/0071687 A1* | 3/2015 | Ishizumi | G03G 15/5058 399/301 |
| 2016/0098041 A1 | 4/2016 | Otsuji et al. | |
| 2016/0266568 A1 | 9/2016 | Kiribuchi | |
| 2018/0284719 A1 | 10/2018 | Lever | |
| 2019/0017625 A1* | 1/2019 | Morris | F16K 31/043 |
| 2020/0173814 A1* | 6/2020 | Kinugasa | B25J 19/06 |

FOREIGN PATENT DOCUMENTS

| | | |
|---|---|---|
| CN | 102375455 A | 3/2012 |
| CN | 103081351 A | 5/2013 |
| CN | 105723290 A | 6/2016 |
| CN | 205450730 U | 8/2016 |
| JP | H07308098 A | 11/1995 |
| JP | H106179 A | 1/1998 |
| JP | H11170122 A | 6/1999 |
| JP | 2000099160 A | 4/2000 |
| JP | 2004139299 A | 5/2004 |
| JP | 2007025887 A | 2/2007 |
| JP | 2014182015 A | 9/2014 |
| JP | 2015024478 A | 2/2015 |
| JP | 2015194401 A | 11/2015 |
| JP | 2018508867 A | 3/2018 |

OTHER PUBLICATIONS

Written Opinion issued in Intl. Appln. No. PCT/JP2019/043728 mailed Jan. 28, 2020. English translation provided.

Office Action issued in Chinese Appln. No. 201980069744.X, mailed Dec. 7, 2023. English translation provided.

\* cited by examiner

CONTROL SYSTEM FOR MONITORING CONTROL STATE OF TARGET DEVICE

FIELD

The present invention relates to a control system for monitoring the control state of a target device that receives drive control performed by a motor.

BACKGROUND

To position an origin for a linear motion device to accurately move a table or other objects to an intended position, a table origin sensor for roughly determining the origin is located along a line along which the table is moved. An output signal from the sensor is used in addition to a rotation origin signal from an incremental encoder attached to a motor to precisely position the origin. However, this origin positioning includes repeatedly adjusting the position of the origin sensor or the angle of the encoder while turning on or off the motor, thus involving skill and many manhours. For example, the technique for setting the origin described in Patent Literature 1 includes detecting the position of the table origin sensor, checking the appropriateness of the position, disconnecting the power supply to the motor, manually rotating the motor, and moving the position of the table origin sensor while monitoring a rotation cycle signal generated in response to rotation of the motor.

CITATION LIST

Patent Literature

Patent Literature 1: Japanese Unexamined Patent Application Publication No. 10-6179

SUMMARY

Technical Problem

To improve safety performance in monitoring the position of a target device as one example of the control state of the target device, a redundant sensor or an encoder with high safety performance has been used also to set the origin position for position monitoring. To achieve high safety performance, the encoder is to be designed to satisfy the requirements of predetermined safety standards such as IEC 61508. IEC 61508 is an international standard for functional safety of electrical, electronic, and programmable electronic safety-related systems. IEC 61508 specifies the failure probability of a system based on a scale called the safety integrity level (SIL) as shown in Table 1 below.

TABLE 1

| | Hardware fault tolerance (HFT) | | |
|---|---|---|---|
| Safe failure fraction (SFF) | 0 | 1 | 2 |
| <60% | Not permitted | SIL 1 | SIL 2 |
| 60%≤-<90% | SIL 1 | SIL 2 | SIL 3 |
| 90%≤-<99% | SIL 2 | SIL 3 | SIL 4 |
| ≥99% | SIL 3 | SIL 4 | SIL 4 |

IEC 61508 defines the requirements to be satisfied for each SIL in the table and provides a target to attain for a constructed system. The SIL is divided into four levels, SIL 1 to SIL 4. A larger SIL value indicates higher safety performance. To increase the SIL value for position monitoring of a target device, the SIL of the encoder is also to be increased, possibly causing potential cost increase and design complexity.

In response to the above issue, one or more aspects of the present invention are directed to a technique using a simpler structure for improving safety performance for position monitoring of a target device that receives drive control performed by a motor.

Solution to Problem

A technique according to one or more aspects of the present invention uses both a leading edge and a trailing edge in a detection signal output from a position sensor for a target device to calculate first position information associated with the position of the target device, and further uses second position information different from the first position information to improve safety performance for position monitoring of the target device.

More specifically, a control system according to an aspect of the present invention is a system for monitoring a control state of a target device to receive drive control performed by a motor. The system includes a determination unit that calculates a position of the target device based on a signal from an encoder for the motor and determines whether the position of the target device is within a predetermined monitoring range, an interrupter that interrupts transmission of a drive signal transmitted, to a driver, to supply a drive current from the driver to the motor, a safety controller that interrupts the drive signal with the interrupter in response to the determination unit determining that the position of the target device deviates from the predetermined monitoring range, a setting unit that sets an origin for the predetermined monitoring range, and at least one sensor that detects the target device driven by the motor reaching a predetermined position in a movable range of the target device. The setting unit includes an obtainer and a calculator. The obtainer obtains, under predetermined drive control over the target device performed by the motor, a leading edge occurring in a detection signal in response to the target device moving toward the predetermined position and a trailing edge occurring in the detection signal in response to the target device moving away from the predetermined position. The detection signal is output from the at least one sensor in response to the target device reaching the predetermined position. The calculator calculates the origin using first position information and second position information. The first position information is associated with the position of the target device and calculated based on the leading edge and the trailing edge included in the detection signal. The second position information is associated with the position of the target device and is different from the first position information.

The control system according to the above aspect of the present invention monitors the control state including the position of the target device that receives drive control performed by the motor. The control system may be integral with a servo driver, an inverter, or another motor drive or may be separate from such a motor drive. The control system according to the above aspect of the present invention determines and monitors the position of the target device using a feedback signal carrying, for example, position information and speed information obtained from the encoder for the motor.

The control system includes the interrupter that interrupts transmission of a drive signal to the driver. The drive signal is transmitted to supply power to the motor. The drive signal is used for generating a drive current supplied to the motor from the driver to move the target device in a predetermined manner. The drive signal is transmitted to the driver from a component upstream from the driver. The interrupter thus interrupts the transmission of the drive signal between the upstream component and the driver. In response to the position of the target device driven by the motor being determined to deviate from the predetermined monitoring range defined for safety, the safety controller interrupts the drive signal to achieve the safety performance of the control system.

To monitor the position of the target device with the control system, the setting unit performs an origin setting process for appropriately defining the predetermined monitoring range. The origin setting process performed by the setting unit uses at least one sensor to output a detection signal associated with the position of the target device. In response to the target device reaching a predetermined position, the sensor outputs a detection signal having a leading edge occurring as the target device moves toward the predetermined position and a trailing edge occurring as the target device moves away from the predetermined position. The obtainer obtains both the leading and trailing edges included in the detection signal. The calculator then calculates the first position information based on the obtained leading and trailing edges in the detection signal. The first position information, which is calculated based on both the leading and trailing edges included in the detection signal, indicates the position of the target device that is less likely to be affected by the direction in which the target device is moved to the predetermined position. The calculator further calculates the origin for position monitoring using the first position information and the second position information. The second position information is associated with the position of the target device, but is different from and independent of the first position information. The calculator uses the first position information and the second position information in a complementary manner to enable such origin setting.

In the control system according to the above aspect of the present invention, as described above, the origin set by the setting unit is less likely to be affected by the motion of the target device for origin setting and has relatively high positional accuracy. The control system thus achieves, based on Table 1 above, higher safety performance using any encoder with relatively low safety performance. For example, the control system can have a larger SIL value for safety performance than the encoder. Thus, the control system has the simpler structure and improves the safety performance for position monitoring of the target device that receives drive control performed by the motor.

In the above control system, the at least one sensor may include a first sensor that detects the target device reaching a first predetermined position being the predetermined position, and a second sensor that detects the target device reaching a second predetermined position. In this case, the obtainer may obtain a leading edge and a trailing edge in a detection signal from the first sensor and a leading edge and a trailing edge in a detection signal from the second sensor. The calculator may calculate, in accordance with motion of the target device under the predetermined drive control, the first position information based on the leading edge and the trailing edge included in the detection signal from the first sensor and the second position information based on the leading edge and the trailing edge included in the detection signal from the second sensor, and may further calculate, as the origin, a predetermined candidate position between a position indicated by the first position information and a position indicated by the second position information in accordance with the motion of the target device under the predetermined drive control.

In the above structure, the setting unit sets the origin based on the first position information associated with the first predetermined position and the second position information associated with the second predetermined position. The first position information and the second position information, each calculated using both the leading and trailing edges in the corresponding detection signal, are less likely to be affected by the motion of the target device and have relatively high positional accuracy. Thus, the predetermined candidate position calculated as the origin based on these sets of information can also have relatively high positional accuracy. The predetermined candidate position can be determined between the position indicated by the first position information and the position indicated by the second position information in accordance with the motion of the target device under the predetermined drive control for the sensors to detect the target device reaching the predetermined positions. For example, the target device may be driven at a constant speed under the predetermined drive control. In this case, the calculator calculates the first position information based on a midpoint between the leading edge and the trailing edge included in the detection signal from the first sensor and the second position information based on a midpoint between the leading edge and the trailing edge included in the detection signal from the second sensor. The calculator may further determine, as the predetermined candidate position, a mid-position between the position indicated by the first position information and the position indicated by the second position information or may determine, as the predetermined candidate position, a position other than the mid-position as in this aspect.

The first sensor and the second sensor in the above control system may be arranged in two different manners described below. In the first manner, the sensors may be arranged with the first predetermined position being away from the second predetermined position to avoid an overlap between an on-time from the leading edge to the trailing edge included in the detection signal from the first sensor and an on-time from the leading edge and the trailing edge included in the detection signal from the second sensor. The distance between the first predetermined position and the second predetermined position can be determined based on, for example, the structure and size of the target device. For example, the first predetermined position and the second predetermined position can be the two ends of a movable range of the target device. In this case, the first and second sensors may be common limit switches.

In the second manner, the sensors may be arranged with the first predetermined position being adjacent to or aligned with the second predetermined position to have a partial or complete overlap between an on-time from the leading edge to the trailing edge included in the detection signal from the first sensor and an on-time from the leading edge to the trailing edge included in the detection signal from the second sensor. In this case as well, the distance between the first predetermined position and the second predetermined position can be determined based on, for example, the structure and size of the target device. For example, the first and second sensors may be common proximity sensors.

In any one of the above control systems, the obtainer may avoid obtaining the leading edge and the trailing edge included in the detection signal from the first sensor in response to the target device under the predetermined drive control turning back before passing the first predetermined position after the leading edge occurs in the detection signal from the first signal, and avoid obtaining the leading edge and the trailing edge included in the detection signal from the second sensor in response to the target device under the predetermined drive control turning back before passing the second predetermined position after the leading edge occurs in the detection signal from the second signal. Such a turnback motion prevents each sensor from outputting an intended detection signal including consecutive leading and trailing edges. This may disable easy generation of position information that is less likely to be affected by the motion of the target device. Thus, the obtainer may avoid obtaining the leading and trailing edges in response to such a turnback motion.

In any one of the above control systems, the setting unit may avoid setting the origin for the predetermined monitoring range when at least one of a first condition or a second condition is dissatisfied. The first condition is that a first confirmative distance calculated based on the leading edge included in the detection signal from the first sensor and the leading edge included in the detection signal from the second sensor is less than or equal to a predetermined first reference distance, and the second condition is that a second confirmative distance calculated based on the trailing edge included in the detection signal from the first sensor and the trailing edge included in the detection signal from the second sensor is less than or equal to a second reference distance. This structure can avoid an inappropriate position monitoring process using an origin deviating from a calculated correct position due to malfunctioning or other causes.

The control system according to the aspects described above includes the first sensor and the second sensor. A control system according to an aspect described below includes a first sensor alone. For example, in the above control system, the at least one sensor may be a first sensor that detects the target device reaching the predetermined position. In this case, the encoder may store the second position information. The obtainer may obtain a leading edge and a trailing edge included in the detection signal from the first sensor. The calculator may calculate, in accordance with motion of the target device under the predetermined drive control, the first position information based on the leading edge and the trailing edge included in the detection signal from the first sensor, compare the first position information with the second position information, and calculate, based on a result of the comparison, a position indicated by the second position information as the origin.

In the above structure, the setting unit sets the origin based on a result of comparison between the first position information associated with the first predetermined position and the second position information stored in the encoder. The first position information, which is calculated using the leading edge and the trailing edge included in the detection signal as described above, is less likely to be affected by the motion of the target device and has relatively high positional accuracy. Thus, the result of comparison between the first position information and the second position information can also be accurate by reflecting the accuracy of the first position information. For example, the first information calculated by the calculator is compared with position information indicating a correct origin position stored as the second position information. When the difference is within an allowable range, the actual position coordinates for the target device are determined to substantially match the expected position coordinates obtained with reference to the origin indicated by the second position information. In this case, the position indicated by the second position information can be set as the origin without adversely affecting the position monitoring of the actual target device.

In the above control system, the target device may be driven at a constant speed under the predetermined drive control. In this case, the calculator may calculate the first position information based on a midpoint between the leading edge and the trailing edge included in the detection signal from the first sensor. Information indicating a position other than the midpoint in the above aspect may also be used as the first position information.

In the above control system, the obtainer may avoid obtaining the leading edge and the trailing edge included in the detection signal from the first sensor in response to the target device under the predetermined drive control turning back before passing the predetermined position after the leading edge occurs in the detection signal from the first sensor. Such a turnback motion prevents the first sensor from outputting an intended detection signal including consecutive leading and trailing edges. This may disable easy generation of position information that is less likely to be affected by the motion of the target device. Thus, the obtainer may avoid obtaining the leading and trailing edges in response to such a turnback motion.

Advantageous Effects

The technique according to the above aspects uses a simpler structure and improves safety performance for position monitoring of the target device that receives drive control performed by a motor.

DETAILED DESCRIPTION

Example Use

Figure 1:
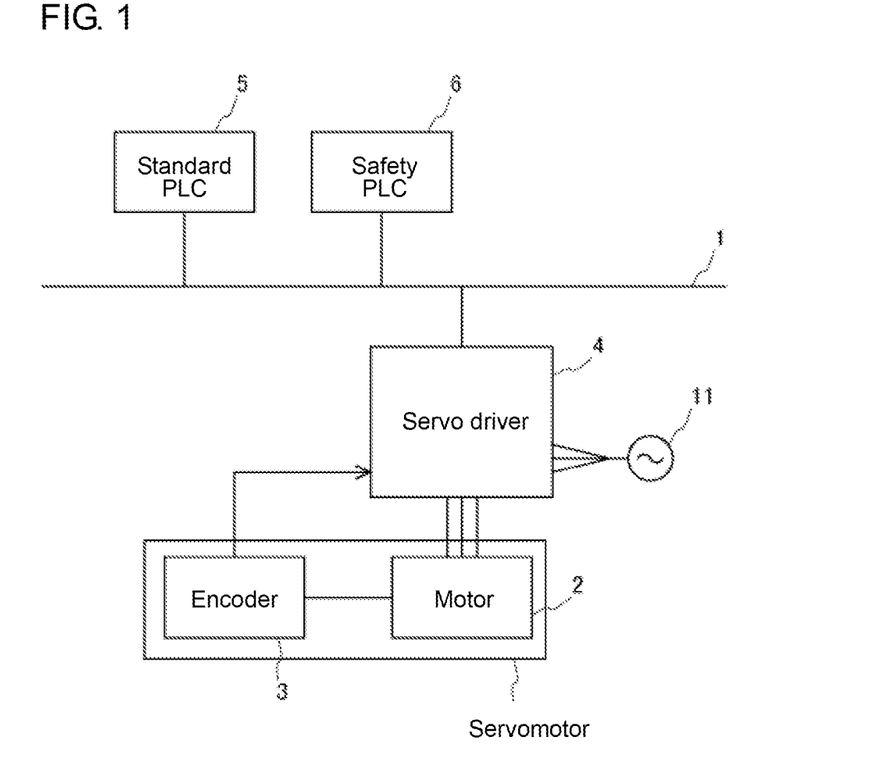
FIG. 1 is a schematic diagram of a servo system incorporating a servo driver.
Figure 2:
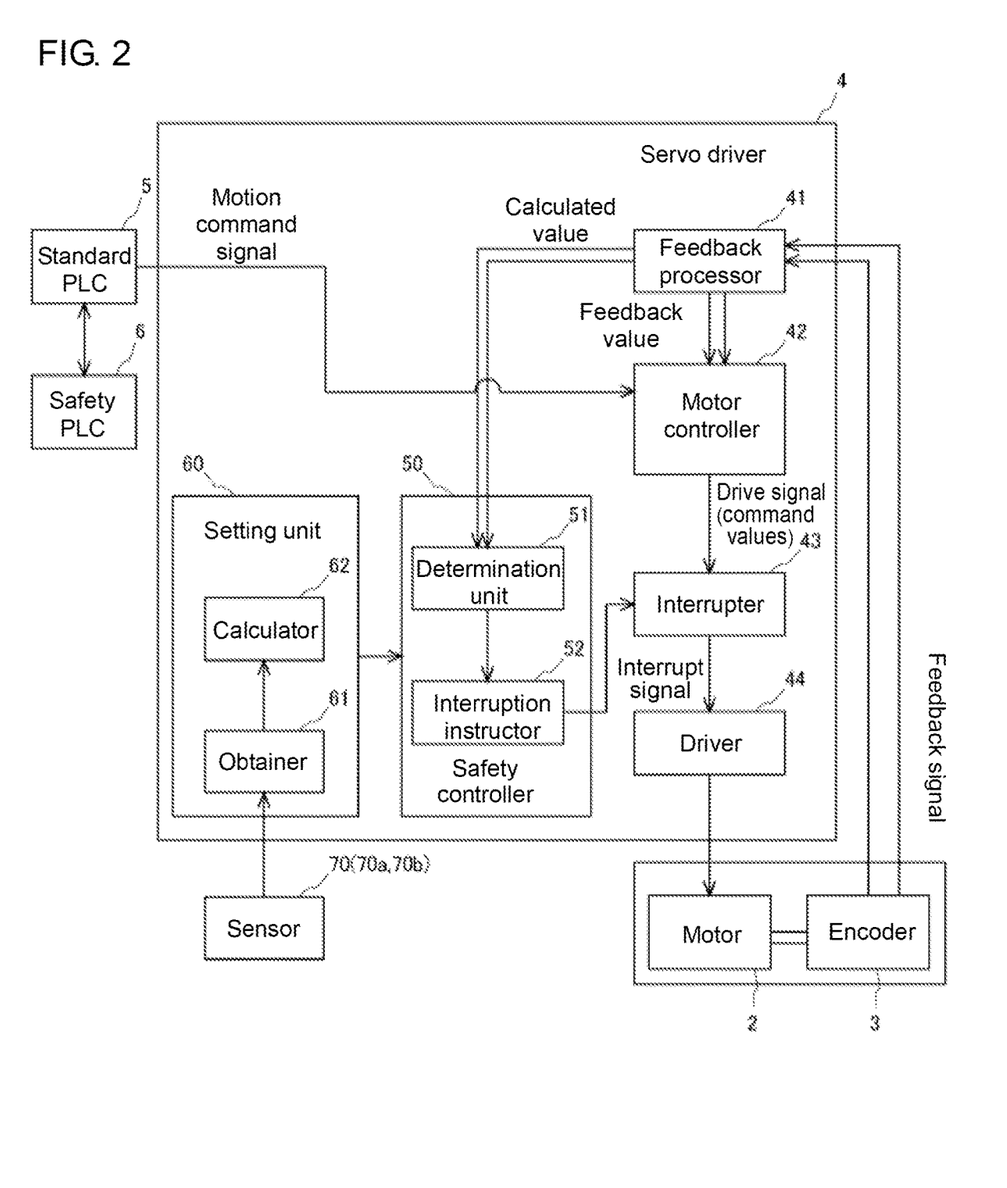
FIG. 2 is a functional block diagram of the servo driver according to an embodiment of the present invention.

An example use of a control system according to an embodiment will now be described with reference to FIGS. 1 and 2. FIG. 1 is a schematic diagram of a servo system incorporating a servo driver 4. The servo system mainly includes a network 1, a motor 2, an encoder 3, the servo driver 4, a standard programmable logic controller (PLC) 5, and a safety PLC 6. The motor 2 and the encoder 3 together form a servomotor. The servo system drives the motor 2, which may be incorporated in a machine such as an industrial robotic arm or a conveyer (not shown) as an actuator.

A target device that receives drive control performed by the motor 2 is hereafter referred to as a workpiece. The motor 2 is, for example, an alternating current (AC) motor. The encoder 3 is attached to the motor 2 to detect the motion of the motor 2. The encoder 3 generates a feedback signal indicating the detected motion of the motor 2 and transmits the feedback signal to the servo driver 4. The feedback signal includes, for example, position information about the rotational position (angle) of the rotational shaft of the motor 2 and information about the rotational speed of the rotational shaft. The encoder 3 may be a common absolute encoder.

The servo driver 4 receives a motion command signal about the motion of the motor 2 from the standard PLC 5 through the network 1 and a feedback signal output from the encoder 3. The servo driver 4 performs servo control for driving the motor 2 based on the motion command signal from the standard PLC 5 and the feedback signal from the encoder 3. The servo driver 4 is also connected to the safety PLC 6 with the network 1. The servo driver 4 thus performs various monitoring processes based on a monitoring command signal received from the safety PLC 6 and returns the monitoring results to the safety PLC 6. For example, the servo driver 4 monitors the position of the workpiece that receives drive control performed by the motor 2, as described later.

The servo driver 4 also calculates a command value about the motion of the motor 2 based on the motion command signal from the standard PLC 5 and the feedback signal from the encoder 3. The servo driver 4 further supplies a drive current to the motor 2 to cause the motion of the motor 2 to follow the command value. The supply current comes from the AC power supplied from an AC power supply 11 to the servo driver 4. In the present embodiment, the servo driver 4 receives a three-phase alternating current. In another embodiment, the servo driver 4 may receive a single-phase alternating current.

The structure of the servo driver 4 will now be described in more detail. FIG. 2 is a functional block diagram of the servo driver 4. As shown in FIG. 2, the servo driver 4 includes a feedback processor 41, a motor controller 42, an interrupter 43, a driver 44, a safety controller 50, and a setting unit 60. The feedback processor 41 generates a feedback value based on a feedback signal from the encoder 3. For example, the feedback processor 41 counts pulses output from the encoder 3 to calculate the rotational position and rotational speed of the rotational shaft of the motor 2 and generates a feedback value including values indicating the position and speed.

The encoder 3 is an absolute encoder. The encoder 3 includes a redundant circuit that performs simultaneous scanning inside the encoder to enable independent pulse output. The encoder 3 outputs a redundant feedback signal. The feedback processor 41 thus receives the redundant feedback signal from the encoder 3 and generates a redundant feedback value based on the feedback signal. The feedback processor 41 then transmits the generated redundant feedback value to the motor controller 42 and to the safety controller 50.

The motor controller 42 receives the motion command signal from the standard PLC 5 and the feedback value from the feedback processor 41. The motor controller 42 generates command values for position feedback control and speed feedback control based on the motion command signal and the feedback value. The feedback control is performed with a feedback method designed as appropriate to enable a servo loop for a predetermined purpose (e.g., conveyance of a load) of a machine (e.g., conveyer) incorporating the motor 2. The command values generated by the motor controller 42 are then transmitted to the interrupter 43 as a drive signal.

The interrupter 43 stops, in response to an interrupt signal received from the safety controller 50 (described later), the driver 44 by electrically interrupting transmission of the drive signal to the driver 44 (described later) from the motor controller 42. This stops the torque output from the motor 2 although the motor controller 42 remains outputting the drive signal. Without an interrupt signal being input, the interrupter 43 allows transmission of the drive signal including the command values output from the motor controller 42 to the driver 44 without interruption.

The driver 44 receives the drive signal from the motor controller 42 through the interrupter 43. The driver 44 includes a circuit including a semiconductor switching element, such as an insulated gate bipolar transistor (IGBT). The driver 44 generates, based on the drive signal from the motor controller 42, a signal for turning on and off the switching element with pulse width modulation (PWM) and turns on and off the switching element in accordance with the generated signal. This supplies AC power to the motor 2, which is driven in accordance with the drive signal. When the interrupter 43 is activated to interrupt transmission of the drive signal to the driver 44, the output from the driver 44 is fixed to an off state. This stops power supply to the motor 2, thus stopping the torque output from the motor 2 and stopping the motion of the workpiece.

In the manner described above, the feedback processor 41, the motor controller 42, the interrupter 43, and the driver 44 directly affect drive control performed by the motor 2. In contrast, the safety controller 50 monitors the control state of the motor. In response to the motor 2 being in an unintended control state, the safety controller 50 stops the motion of the motor 2 to ensure safety against the motion. Although the control state monitored by the safety controller 50 can be set as appropriate, the position of the workpiece that receives drive control performed by the motor 2 is used as one example of the control state of the workpiece. In response to the position of the monitored workpiece deviating from a predetermined monitoring range, the safety controller 50 identifies a safety hazard and transmits an interrupt signal to the interrupter 43 to stop the motor 2.

The safety controller 50 includes a determination unit 51 and an interruption instructor 52. The safety controller 50 controls the position monitoring based on a monitoring command from the safety PLC 6. The determination unit 51 calculates the position of the workpiece (hereafter, a workpiece position) based on the signal from the encoder 3 for the motor 2 and determines whether the workpiece position is within the predetermined monitoring range. More specifically, the determination unit 51 receives the redundant feedback value from the feedback processor 41 and calculates the workpiece position based on the feedback value. The calculated workpiece position is represented with reference to an origin position, which is set by the setting unit 60 (described later). To ensure safety, the workpiece is to remain within the predetermined monitoring range. The predetermined monitoring range can be defined as appropriate based on, for example, the workpiece motion controlled by the motor 2. The workpiece position deviating from the predetermined monitoring range indicates that the workpiece can be in an unsafe situation under drive control performed by the motor 2.

In response to the determination unit 51 determining that the workpiece position deviates from the predetermined monitoring range, the interruption instructor 52 generates an interrupt signal and transmits the generated interrupt signal to the interrupter 43. The interrupter 43 receiving the interrupt signal interrupts the transmission of the drive signal from the motor controller 42 to the driver 44 as described above and stops the torque output from the motor 2. The control state (e.g., a monitoring result of the workpiece position) determined by the safety controller 50 is transmitted to the safety PLC 6 as a response to the monitoring command from the safety PLC 6.

The setting unit 60 will now be described. The setting unit 60 includes an obtainer 61 and a calculator 62. The setting unit 60 sets the origin for position monitoring performed by the safety controller 50. The obtainer 61 and the calculator 62 perform processing associated with the origin setting. A sensor 70 detects, in a movable range of the workpiece, the workpiece driven by the motor 2 and reaching a predetermined position. The sensor 70 outputs a detection signal having a leading edge that occurs in response to the workpiece moving toward the predetermined position and a trailing edge that occurs in response to the workpiece moving away from the predetermined position. For example, for the sensor 70 outputting a high-level signal in response to the absence of the workpiece at the predetermined position and outputting a low-level signal in response to the presence of the workpiece at the predetermined position, the leading edge included in the detection signal represents a transition from a high level to a low level, and the trailing edge included in the detection signal represents a transition from a low level to a high level. Conversely, for the sensor 70 outputting a low-level signal in response to the absence of the workpiece at the predetermined position and outputting a high-level signal in response to the presence of the workpiece at the predetermined position, the leading edge included in the detection signal represents a transition from a low level to a high level, and the trailing edge included in the detection signal represents a transition from a high level to a low level. The obtainer 61 obtains the leading and trailing edges in the detection signal from the sensor 70. In one or more embodiments, the servo driver 4 may include two sensors 70, which are distinguished as sensors 70a and 70b. A single sensor or a set of sensors that are not to be distinguished is referred to as a sensor 70.

The calculator 62 calculates the origin position for position monitoring performed by the safety controller 50 using first position information associated with a workpiece position and the second position information also associated with a workpiece position but differing from the first position information. The first position information is calculated based on the leading and trailing edges in the detection signal obtained from the sensor 70 by the obtainer 61. The first position information, which is calculated based on the leading and trailing edges in the detection signal from the sensor 70, indicates the workpiece position determined based on two items of information about the workpiece reaching the predetermined position, or more specifically, about the workpiece moving toward and away from the predetermined position. In other words, the first position information is determined by constantly reflecting the position of the workpiece toward or away from the predetermined position. Thus, the first position information is less likely to be affected by the direction in which the workpiece is moved to the predetermined position. The calculator 62 calculates the origin for position monitoring using the first position information and the second position information, which is also associated with the workpiece position but is independent of and different from the first position information. The second position information and the first position information complement each other to enable origin calculation. Examples of the second position information will be described later.

The origin calculated by the calculator 62 is output to the safety controller 50 by the setting unit 60 and used as the origin for defining the position for position monitoring of the workpiece performed by the safety controller 50. As described above, in the servo driver 4, the origin set by the setting unit 60 is less likely to be affected by the motion of the workpiece (the direction in which the workpiece is moved to the predetermined position) for origin setting, thus having relatively high positional accuracy. The servo driver 4 can thus have higher safety performance although the encoder 3 has relatively low safety performance. The servo driver 4 has the simpler structure and improves the safety performance for position monitoring of the workpiece that receives drive control performed by the motor 2.

First Example Structure

Figure 3:
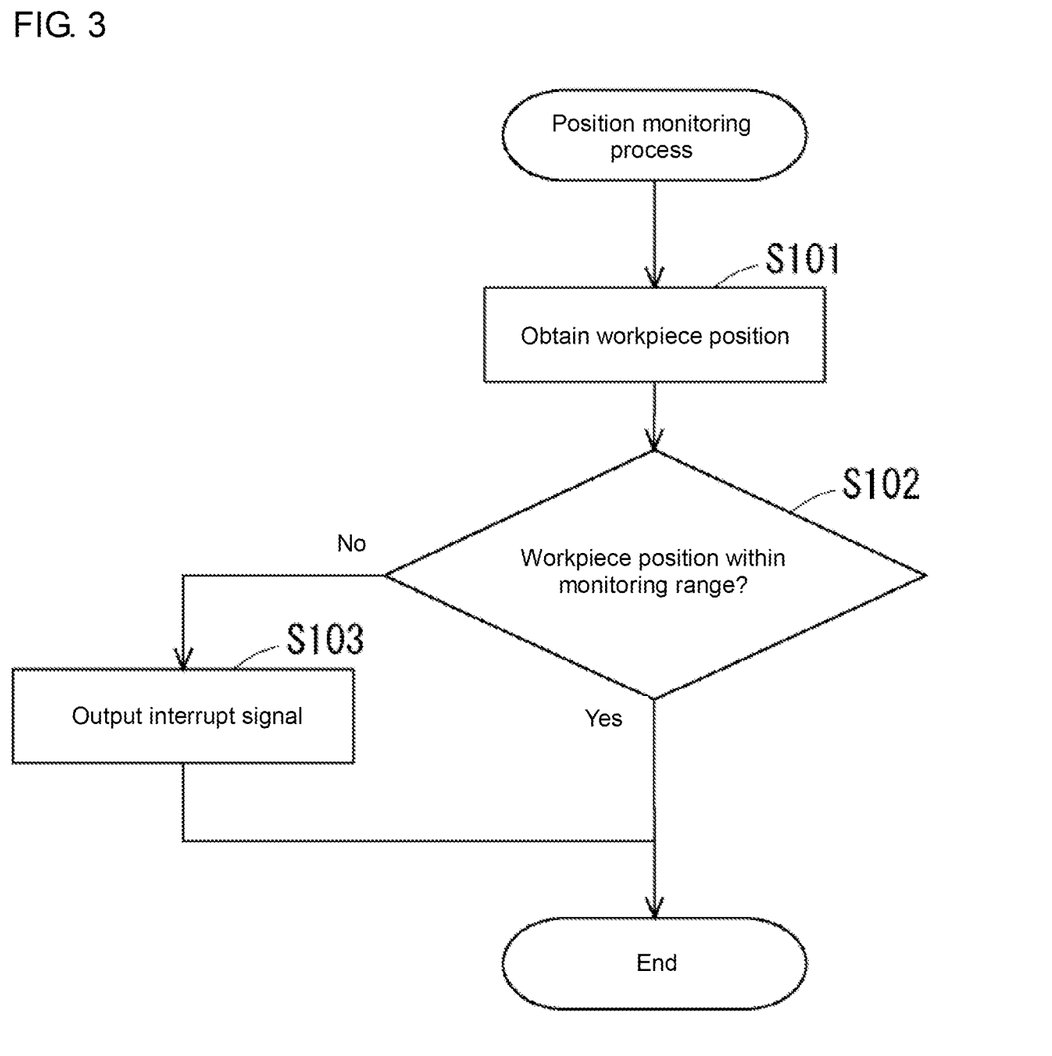
FIG. 3 is a flowchart showing a position monitoring process performed by the servo driver according to the embodiment of the present invention.

A position monitoring process performed by the safety controller 50 including the determination unit 51 and the interruption instructor 52 will now be described with reference to FIG. 3. The position monitoring process shown in FIG. 3 is performed repeatedly by an arithmetic unit (e.g., a microprocessor unit or MPU) implementing the safety controller 50 in, for example, control cycles in which the command value is generated (e.g., 2 msec). In step S101, the determination unit 51 obtains the position of the workpiece that receives drive control performed by the motor 2. More specifically, the determination unit 51 calculates the workpiece position using a calculated value received from the feedback processor 41, or more specifically, the information calculated based on the feedback signal from the encoder 3. In this step, the workpiece position is determined with reference to the origin set by the setting unit 60. After the processing is complete in step S101, the process advances to S102.

In step S102, the determination unit 51 determines whether the workpiece position obtained in step S101 is within the predetermined monitoring range. The predetermined monitoring range has been described above. In response to an affirmative determination in step S102, the position monitoring process ends. In this case, the interruption instructor 52 outputs no interrupt signal. In response to a negative determination in step S102, the process advances to step S103. In step S103, the interruption instructor 52 generates an interrupt signal and transmits the generated interrupt signal to the interrupter 43. This stops the torque output from the motor 2.

Figure 4:
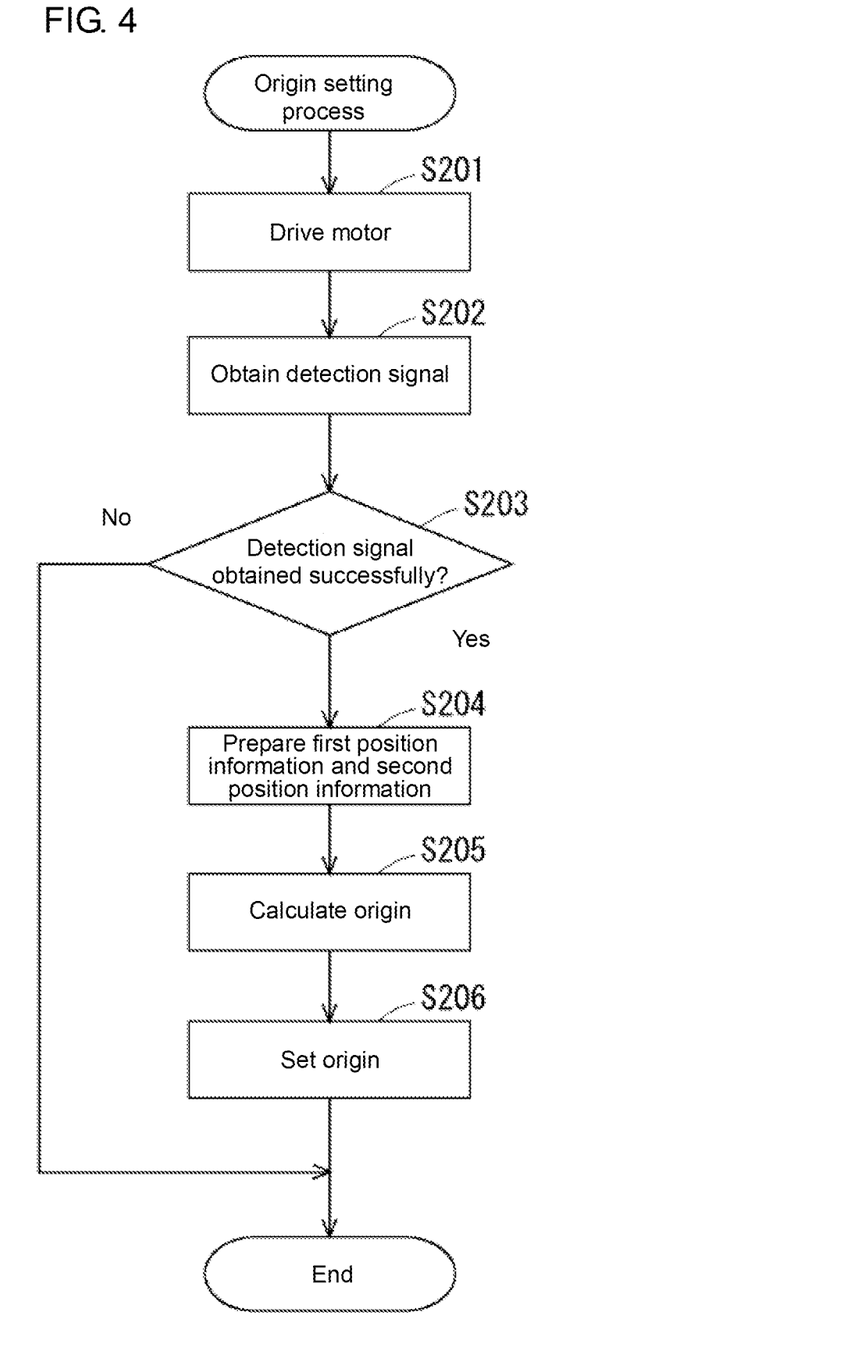
FIG. 4 is a flowchart showing an origin setting process performed by the servo driver according to the embodiment of the present invention.

A process for setting the origin for position monitoring (origin setting process), used in the position monitoring process, will now be described with reference to FIG. 4. The origin setting process shown in FIG. 4 is performed by the arithmetic unit (e.g., MPU) implementing the safety controller 50 in response to, for example, the servo driver 4 being turned on and activated. In this example, the servo system includes the two sensors 70a and 70b. The sensors 70a and 70b are limit switches, which are installed at positions corresponding to the two limits of travel of the workpiece in a range in which the workpiece is movable by the motor 2. In this example, a sensor corresponding to a first limit is a first sensor 70a, and a sensor corresponding to a second limit is a second sensor 70b. As shown in the upper part of FIG. 5A, when the workpiece is moved by the motor 2 from the first limit to the second limit, the first sensor 70a first detects the workpiece reaching the predetermined position in a detection signal SOPT1, and then the second sensor 70b detects the workpiece reaching the predetermined position in a detection signal SOPT2. The detection signal from the first sensor 70a includes a high-to-low transition ds11 and a low-to-high transition ds12. The detection signal from the second sensor 70b includes a high-to-low transition ds21 and a low-to-high transition ds22. The transition from a high level to a low level is represented by the leading edge included in the detection signal, and the transition from a low level to a high level is represented by the trailing edge included in the detection signal. The limit switches, or the first sensor 70a and the second sensor 70b, located sufficiently away from each other has no overlap between the on-time (the duration from the leading edge ds11 to the trailing edge ds12) Δt1 in the detection signal from the first sensor 70a and the on-time (the duration from the leading edge ds21 to the trailing edge ds22) Δt2 in the detection signal from the second sensor 70b.

In step S201, the motor 2 first performs predetermined drive control for origin setting. More specifically, the motor 2 drives and controls the workpiece to travel from the first limit to the second limit, or more specifically, from the first sensor 70a to the second sensor 70b at a constant speed. As shown in the lower part of FIG. 5A, in response to the workpiece reaching the first limit under the drive control, the leading edge ds11 occurs in the detection signal SOPT1 from the first sensor 70a at time t11, and then the trailing edge ds12 occurs in the detection signal SOPT1 from the first sensor 70a at time t12 (t12>t11). In response to the workpiece reaching the second limit under the drive control, the leading edge ds21 occurs in the detection signal SOPT2 from the second sensor 70b at time t21, and then the trailing edge ds22 occurs in the detection signal SOPT2 from the second sensor 70b at time t22 (t22>t21). In the graph shown in the lower part of FIG. 5A, the horizontal axis represents time, the vertical axis represents the position of the workpiece, and the line L1 represents the travel of the workpiece.

Figure 5A:
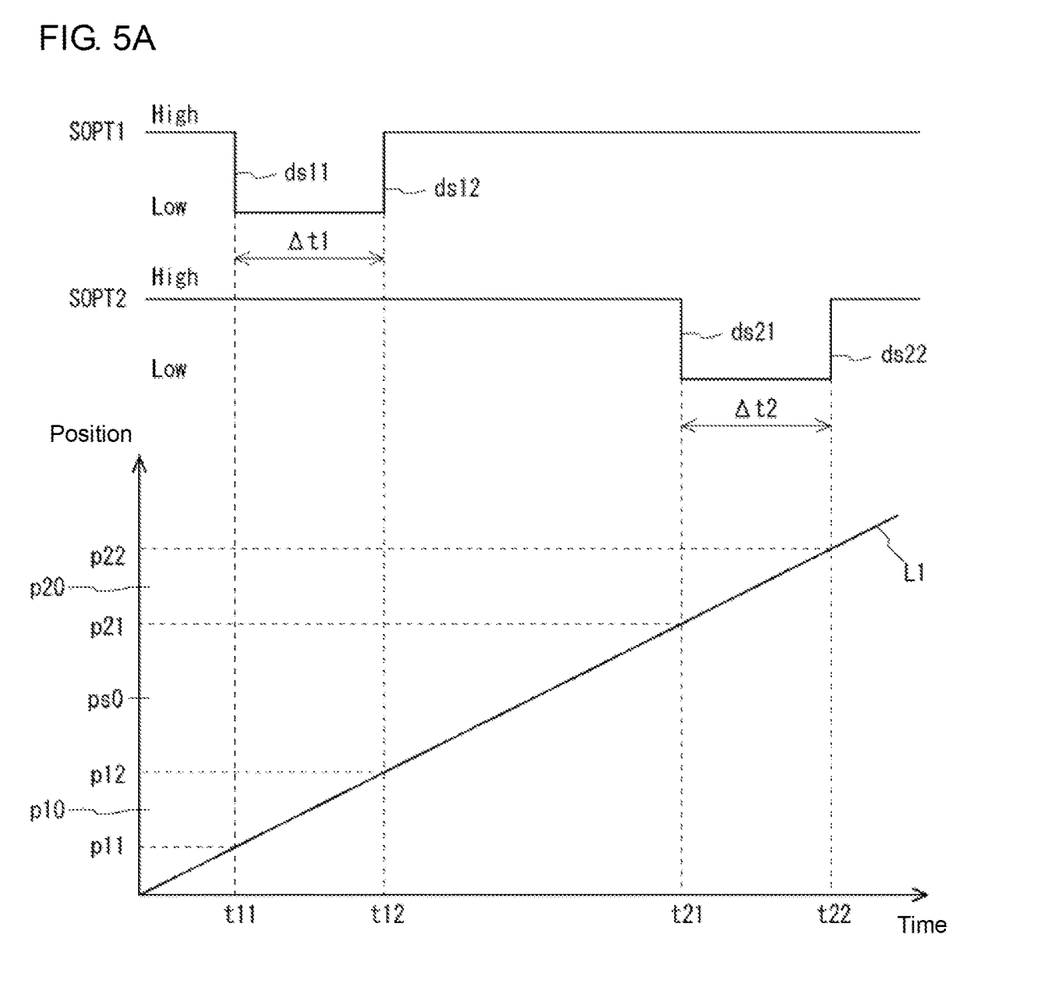
FIG. 5A is a diagram showing a first calculation of an origin in the origin setting process shown in FIG. 4.

In step S202, under the drive control performed by the motor 2, the detection signal from the first sensor 70a and the detection signal from the second sensor 70b are obtained. More specifically, in response to the workpiece reaching the first limit, the obtainer 61 obtains the leading edge ds11 and the trailing edge ds12 in the detection signal SOPT1 from the first sensor 70a. Subsequently, in response to the workpiece reaching the second limit, the obtainer 61 obtains the leading edge ds21 and the trailing edge ds22 in the detection signal SOPT2 from the second sensor 70b.

The leading edge ds11 and the trailing edge ds12 included in the detection signal SOPT1 from the first sensor 70a are to be obtained while the workpiece is moving continuously. A turnback motion of the workpiece (motion in the direction opposite to the traveling direction) after occurrence of the leading edge ds11 and before occurrence of the trailing edge ds12 prevents the first sensor 70a from outputting a detection signal including consecutive leading and trailing edges. This may disable easy generation of position information that is less likely to be affected by the motion of the workpiece. Thus, in response to the workpiece moving in a predetermined manner in the origin setting process, the leading edge ds11 and the trailing edge ds12 included in the detection signal SOPT1 are not obtained. This will be described based on example cases 1 to 7 shown in FIG. 5B. The workpiece is also to be moved continuously to obtain the leading edge ds21 and the trailing edge ds22 in the detection signal SOPT2 from the second sensor 70b.

Figure 5B:
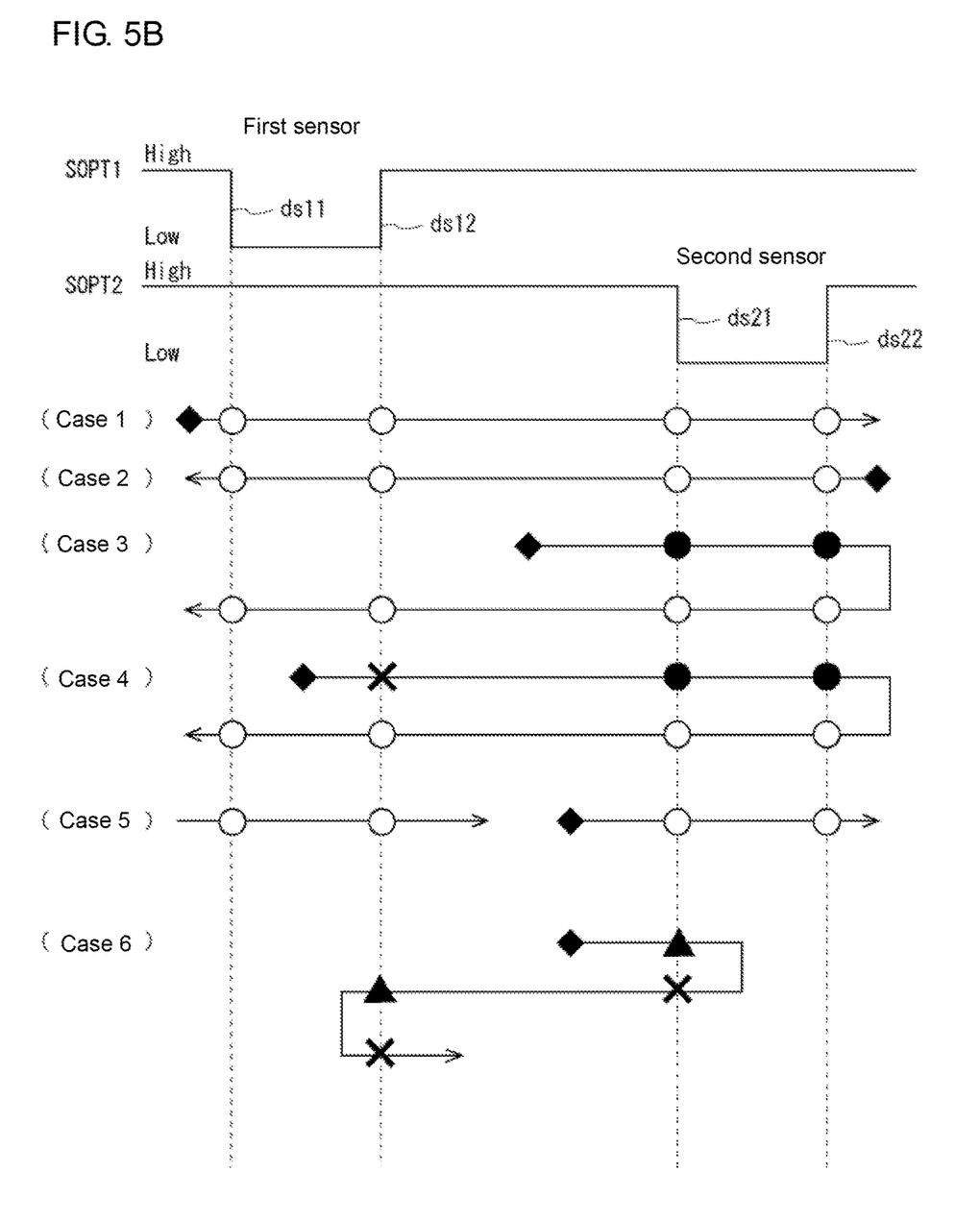
FIG. 5B is a diagram showing motions of a workpiece for the origin calculation shown in FIG. 5A.

FIG. 5B shows six example motions of the workpiece in cases 1 to 6. In FIG. 5B, the diamond symbols represent the initial positions of the workpiece, the open circle symbols represent the positions at which a detection signal is obtained, and the filled circle symbols represent the positions at which a detection signal once obtained is canceled. The cross symbols represent the positions at which a detection signal is not allowed to be obtained, and the black triangle symbols represent positions at which a detection signal stops being obtained.

In case 1, the workpiece moves from the first limit to the second limit. In this case, the leading edge ds11 and the trailing edge ds12 in the detection signal SOPT1 from the first sensor 70a are obtained, and then the leading edge ds21 and the trailing edge ds22 in the detection signal SOPT2 from the second sensor 70b are obtained.

In case 2, the workpiece moves from the second limit to the first limit, opposite to the motion of the workpiece in case 1. In this case, the leading edge ds22 and the trailing edge ds21 in the detection signal SOPT2 from the second sensor 70b are obtained, and then the leading edge ds12 and the trailing edge ds11 in the detection signal SOPT1 from the first sensor 70a are obtained.

In case 3, the leading edge ds21 and the trailing edge ds22 in the detection signal SOPT2 from the second sensor 70b are once obtained, and then the workpiece reverses its traveling direction and moves from the second limit to the first limit. In this case, the leading edge ds21 and the trailing edge ds22 first obtained in the detection signal SOPT2 are cancelled, and the subsequent leading edge ds22 and the trailing edge ds21 in the detection signal SOPT2 and the subsequent leading edge ds12 and the trailing edge ds11 in the detection signal SOPT1 are obtained.

In case 4, the workpiece moves from an initial position that is between the position corresponding to the leading edge ds11 and the position corresponding to the trailing edge ds12 in the detection signal SOPT1 from the first sensor 70a. Thus, the first trailing edge ds12 in the detection signal SOPT1 is not allowed to be obtained. After the trailing edge ds12, the detection signal generated in response to the motion of the workpiece is obtained in substantially the same manner as in case 3.

In case 5, the initial position of the workpiece is between the first limit and the second limit. The workpiece first moves to the second limit and then moves from the first limit toward the initial position. In this case, the leading edge ds21 and the trailing edge ds22 in the detection signal SOPT2 from the second sensor 70b are obtained, and then the leading edge ds11 and the trailing edge ds12 in the detection signal SOPT1 from the first sensor 70a are obtained.

In case 6, the initial position of the workpiece is between the first limit and the second limit. Although the workpiece first moves toward the second limit, the workpiece turns back after occurrence of the leading edge ds21 and before occurrence of the trailing edge ds22 in the detection signal SOPT2, thus having the trailing edge ds21. As in this case, for the workpiece reversing the traveling direction between the transitions ds21 and ds22 in the detection signal, the leading edge ds21 and the trailing edge ds21 are not allowed to be obtained. The workpiece then moves toward the first limit, but turns back after transition to the leading edge ds12 and before transition to the trailing edge ds21, thus having the trailing edge ds12. As in this case, for the workpiece reversing its traveling direction between the transitions ds12 and ds11 in the detection signal, the leading edge ds12 and the trailing edge ds12 are not allowed to be obtained.

In step S203, the determination is performed as to whether the leading and trailing edges in the detection signal SOPT1 from the first sensor 70a and the leading and trailing edges in the detection signal SOPT2 from the second sensor 70b have been successfully obtained. In response to an affirmative determination in step S203, the process advances to step S204. In response to a negative determination result, the origin setting process ends.

In step S204, the first position information is prepared based on the obtained leading and trailing edges in the detection signal SOPT1 from the first sensor 70a, and the second position information is prepared based on the obtained leading and trailing edges in the detection signal SOPT2 from the second sensor 70b. The first position information and the second position information are prepared in an example manner described below for the workpiece moving as in case 1, or more specifically, for the detection signal from each sensor output in the manner shown in FIG. 5A. In this example, based on the workpiece constant at a constant speed, the first position information indicates the position corresponding to a midpoint p10 between a position p11 corresponding to the leading edge ds11 and a position p12 corresponding to the trailing edge ds12. Similarly, the second position information indicates the position corresponding to a midpoint p20 between a position p21 corresponding to the leading edge ds21 and a position p22 corresponding to the trailing edge ds22. After the processing is complete in step S204, the process advances to step S205.

In step S205, the origin is calculated by the calculator 62 based on the first position information and the second position information prepared in step S204. More specifically, based on the workpiece constant at a constant speed, the origin is calculated to be a mid-position ps0 between the position p10 indicated by the first position information and the position p20 indicated by the second position information. The origin calculated in this manner is output to the safety controller 50 by the setting unit 60 in step S206 and set as the origin for safety monitoring.

As described above, the origin setting process uses both the leading and trailing edges in each detection signal to calculate the first position information and the second position information. Thus, the information indicating the workpiece position is less likely to be affected by the direction in which the workpiece is moved to the predetermined position and thus has relatively high accuracy. The control system thus has higher safety performance although the encoder 3 has relatively low safety performance. Thus, the control system has the simpler structure and improve the safety performance for position monitoring of the workpiece that receives drive control performed by the motor 2.

Modifications

In the origin setting process described above, the calculated origin position may deviate from the correct position as calculated due to malfunctioning or other causes, and the safety controller 50 may perform an inappropriate position monitoring process. To avoid this, the distance between a position associated with the first sensor 70a and a position associated with the second sensor 70b may further be monitored. More specifically, in step S206, the setting unit 60 avoids setting the origin calculated in step S205 when at least one of a first condition or a second condition is dissatisfied.

First Condition

The distance (p21 to p11) between the position p11 corresponding to the leading edge ds11 in the detection signal SOPT1 from the first sensor 70a and the position p21 corresponding to the leading edge ds21 in the detection signal SOPT2 from the second sensor 70b is less than or equal to a predetermined first reference distance.

Second Condition

The distance (p22 to p12) between the position p12 corresponding to the trailing edge ds12 in the detection signal SOPT1 from the first sensor 70a and the position p22 corresponding to the leading edge ds22 in the detection signal SOPT2 from the second sensor 70b is less than or equal to a predetermined second reference distance.

Second Example Structure

A second example structure for performing the origin setting process shown in FIG. 4 will now be described with reference to FIG. 6. In this example as well, the servo system includes two sensors or a first sensor 70a and a second sensor 70b. The first sensor 70a is a photoelectric sensor, and the second sensor 70b is a proximity sensor. The two sensors are installed adjacent to each other in a movable range of the workpiece. As shown in the upper part of FIG. 6, the on-time (the duration from the leading edge ds11 to the trailing edge ds12) Δt1 in the detection signal from the first sensor 70a partly overlaps the on-time (the duration from the leading edge ds21 to the trailing edge ds22) Δt2 in the detection signal from the second sensor 70b.

Figure 6:
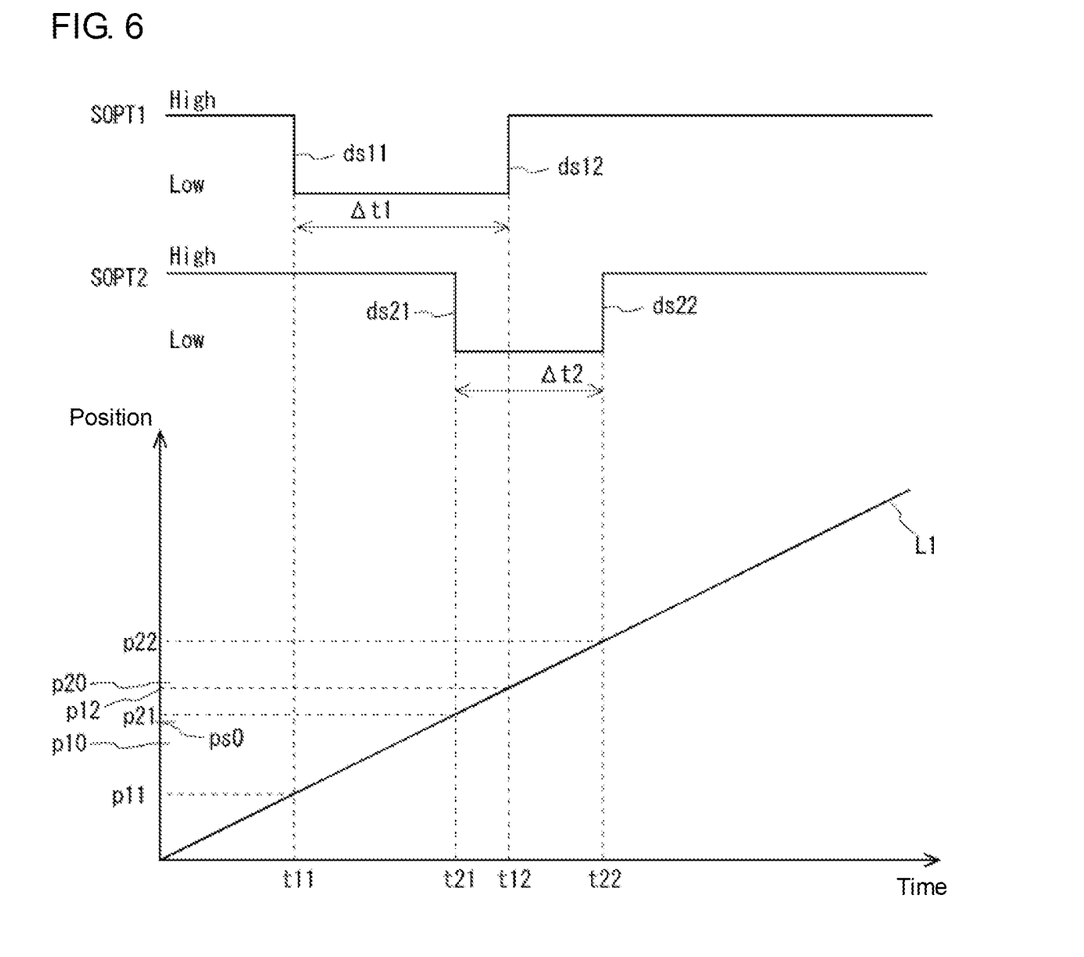
FIG. 6 is a diagram showing a second calculation of an origin in the origin setting process shown in FIG. 4.

Thus, in response to the workpiece being moved by the motor 2 as in case 1 in FIG. 5B, as shown in the upper part of FIG. 6, the first sensor 70a first detects the workpiece reaching the predetermined position in the detection signal SOPT1, causing the leading edge ds11. Before the trailing edge ds12 occurs in the detection signal SOPT1, the second sensor 70b detects the workpiece reaching the predetermined position in the detection signal SOPT2, causing the leading edge ds21. The trailing edge ds12 then occurs in the detection signal SOPT1, and the trailing edge ds22 occurs in the detection signal SOPT2. In this structure as well, in response to an affirmative determination in step S203 in the origin setting process, the first position information indicates, based on the workpiece constant at a constant speed, the position corresponding to a midpoint p10 between a position p11 corresponding to the leading edge ds11 and a position p12 corresponding to the trailing edge ds12 in subsequent step S204. Similarly, the second position information indicates the position corresponding to a midpoint p20 between a position p21 corresponding to the leading edge ds21 and a position p22 corresponding to the trailing edge ds22. In subsequent step S205, based on the workpiece constant at a constant speed, a mid-position ps0 between the position p10 indicated by the first position information and the position p20 indicated by the second position information is calculated as the origin. The calculated origin is output to the safety controller 50 by the setting unit 60 in step S206 and set as the origin for safety monitoring.

In this example as well, the leading edge ds11 and the trailing edge ds12 in the detection signal SOPT1 from the first sensor 70a and the leading edge ds21 and the trailing edge ds22 in the detection signal SOPT2 from the second sensor 70b are to be obtained while the workpiece is moving continuously. Thus, when the workpiece turns back between the leading edge and the trailing edge included in the detection signal SOPT1 or SOPT2 as shown in FIG. 5B, such leading and trailing edges associated with the turnback motion are not allowed to be obtained. As in the modification described above, the distance between the position associated with the first sensor 70a and the position associated with the second sensor 70b may also be monitored in this example.

In this example as well, the first position information and the second position information are calculated using both the leading and trailing edges in each detection signal. Thus, the information indicating the workpiece position is less likely to be affected by the direction in which the workpiece is moved to the predetermined position and thus has relatively high accuracy. The control system thus has the simpler structure and improves the safety performance for position monitoring of the workpiece that receives drive control performed by the motor 2.

Third Example Structure

Figure 7:
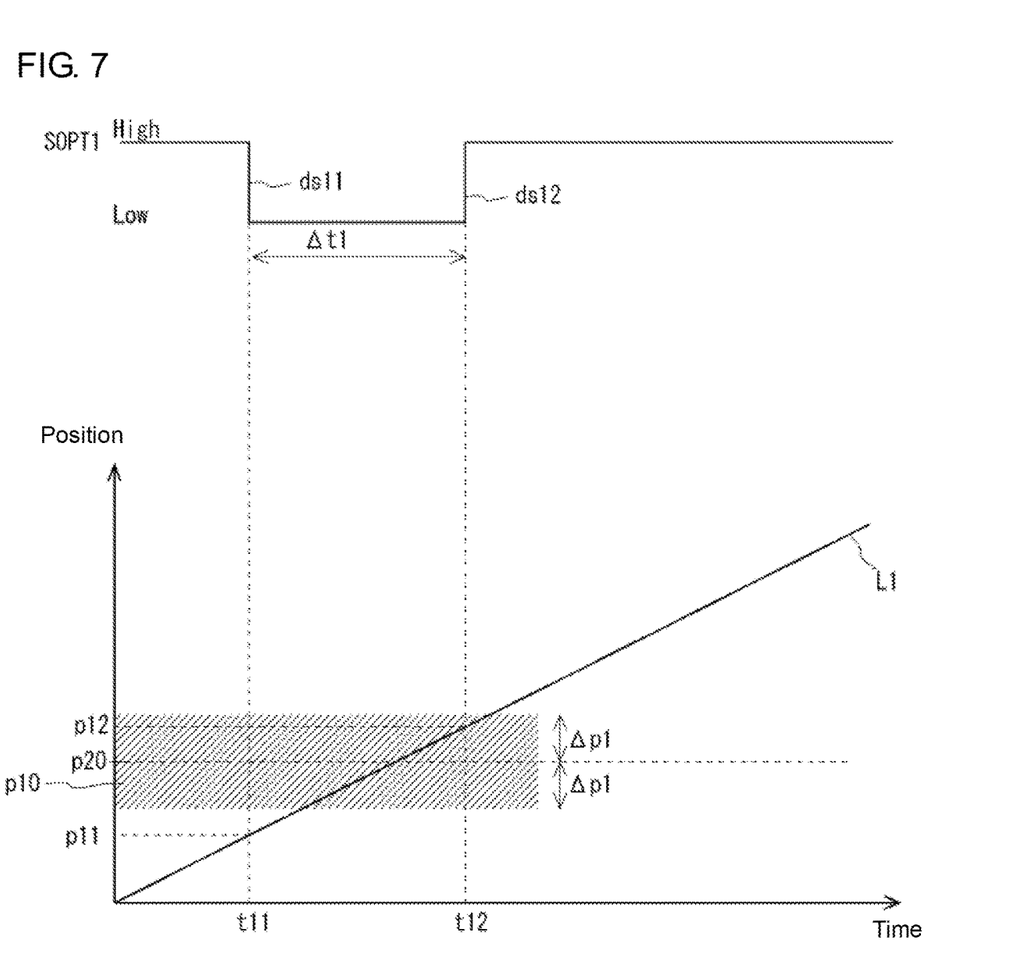
FIG. 7 is a diagram showing a third calculation of an origin in the origin setting process shown in FIG. 4.

A third example structure for performing the origin setting process shown in FIG. 4 will now be described with reference to FIG. 7. In this example, the servo system includes a single first sensor 70. The first sensor 70 may either be a photoelectric sensor or a proximity sensor. The encoder 3 includes an internal memory, which prestores information indicating an origin position (origin position information). Thus, in response to the workpiece being moved by the motor 2 as in case 1 in FIG. 5B, as shown in the upper part of FIG. 7, the first sensor 70 first detects the workpiece reaching the predetermined position in the detection signal SOPT1, causing the leading edge ds11 and then the trailing edge ds12.

In this structure as well, in response to an affirmative determination in step S203 in the origin setting process, the first position information indicates, based on the workpiece constant at a constant speed, the position corresponding to a midpoint p10 between a position p11 corresponding to the leading edge ds11 and a position p12 corresponding to the trailing edge ds12 in subsequent step S204. The second position information is the origin position information stored in the memory in the encoder 3. The second position information (origin position information) indicates the origin position p20 shown in FIG. 7.

In subsequent step S205, the first position information and the second position information prepared in step S204 are compared to calculate the origin based on the comparison result. More specifically, when the position p10 indicated by the first position information calculated based on the leading edge ds11 and the trailing edge ds12 in the detection signal SOPT1 is within a predetermined range from the position p20 indicated by the second position information (or within a range Δp1 from the position p20), or more specifically, when the position p10 deviates from the position p20 within the predetermined range, the position coordinates for the actual workpiece substantially match the expected position coordinates obtained with reference to the origin indicated by the second position information. In this case, the position p20 indicated by the second position information can be output to the safety controller 50 by the setting unit 60 and set as the origin in step S206 for safety monitoring without adversely affecting the position monitoring of the actual workpiece. The first position information, which is calculated using the leading edge ds11 and the trailing edge ds12 in the detection signal SOPT1 as above, is less likely to be affected by the motion of the workpiece, thus having relatively high positional accuracy and allowing higher positional accuracy in the origin setting described above.

In this example as well, the leading edge ds11 and the trailing edge ds12 in the detection signal SOPT1 from the first sensor 70 are to be obtained while the workpiece is moving continuously. Thus, when the workpiece turns back between the leading edge and the trailing edge included in the detection signal SOPT1 as shown in FIG. 5B, such leading and trailing edges associated with the turnback motion are not allowed to be obtained.

Appendix 1

A control system for monitoring a control state of a target device to receive drive control performed by a motor (2), the system comprising:

a determination unit (51) configured to calculate a position of the target device based on a signal from an encoder (3) for the motor (2) and determine whether the position of the target device is within a predetermined monitoring range;

an interrupter (43) configured to interrupt transmission of a drive signal to a driver (44), the drive signal being transmitted to supply a drive current from the driver (44) to the motor (2);

a safety controller (50) configured to interrupt the drive signal with the interrupter (43) in response to the determination unit (51) determining that the position of the target device deviates from the predetermined monitoring range;

a setting unit (60) configured to set an origin for the predetermined monitoring range; and at least one sensor (70, 70*a*, 70*b*) configured to detect the target device driven by the motor reaching a predetermined position in a movable range of the target device, wherein the setting unit (60) includes an obtainer (61) configured to obtain, under predetermined drive control over the target device performed by the motor (2), a leading edge occurring in a detection signal in response to the target device moving toward the predetermined position and a trailing edge occurring in the detection signal in response to the target device moving away from the predetermined position, the detection signal being output from the at least one sensor (70, 70*a*, 70*b*) in response to the target device reaching the predetermined position, and a calculator (62) configured to calculate the origin using first position information and second position information, the first position information is associated with the position of the target device and calculated based on the leading edge and the trailing edge included in the detection signal, and the second position information is associated with the position of the target device and is different from the first position information.

DESCRIPTION OF SYMBOLS

1 network
2 motor
3 encoder
4 servo driver
43 interrupter
44 driver
50 safety controller
51 determination unit
52 interruption instructor
60 setting unit
61 obtainer
62 calculator
70, 70*a*, 70*b* sensor

The invention claimed is:

1. A control system for monitoring a control state of a target device to receive drive control performed by a motor, the system comprising:

one or more processors configured to implement (i) a determination unit configured to calculate a position of the target device based on a signal from an encoder for the motor and determine whether the position of the target device is within a predetermined monitoring range, and (ii) a setting unit configured to set an origin for the predetermined monitoring range;

an interrupter configured to interrupt transmission of a drive signal to a driver, the drive signal being transmitted to supply a drive current from the driver to the motor;

a safety controller configured to interrupt the drive signal with the interrupter in response to the determination unit determining that the position of the target device deviates from the predetermined monitoring range; and at least one sensor configured to detect the target device driven by the motor reaching a predetermined position in a movable range of the target device, wherein the setting unit includes:

an obtainer configured to obtain, under predetermined drive control over the target device performed by the motor, a leading edge occurring in a detection signal in response to the target device moving toward the predetermined position and a trailing edge occurring in the detection signal in response to the target device moving away from the predetermined position, the detection signal being output from the at least one sensor in response to the target device reaching the predetermined position, and a calculator configured to calculate the origin using first position information and second position information, the first position information is associated with the position of the target device and calculated based on the leading edge and the trailing edge included in the detection signal, and the second position information is associated with the position of the target device and is different from the first position information, and wherein the at least one sensor includes a first sensor configured to detect the target device reaching a first predetermined position being the predetermined position, and a second sensor configured to detect the target device reaching a second predetermined position, the obtainer obtains a leading edge and a trailing edge in a detection signal from the first sensor and a leading edge and a trailing edge in a detection signal from the second sensor, and the calculator calculates, in accordance with motion of the target device under the predetermined drive control, the first position information based on the leading edge and the trailing edge included in the detection signal from the first sensor and the second position information based on the leading edge and the trailing edge included in the detection signal from the second sensor, and further calculates, as the origin, a predetermined candidate position between a position indicated by the first position information and a position indicated by the second position information in accordance with the motion of the target device under the predetermined drive control.

2. The control system according to claim 1, wherein the target device is driven at a constant speed under the predetermined drive control, and the calculator calculates the first position information based on a midpoint between the leading edge and the trailing edge included in the detection signal from the first sensor and the second position information based on a midpoint between the leading edge and the trailing edge included in the detection signal from the second sensor, and further determines, as the predetermined candidate position, a mid-position between the position indicated by the first position information and the position indicated by the second position information.

3. The control system according to claim 1, wherein the first predetermined position is away from the second predetermined position to avoid an overlap between an on-time from the leading edge to the trailing edge included in the detection signal from the first sensor and an on-time from the leading edge to the trailing edge included in the detection signal from the second sensor.

4. The control system according to claim 1, wherein the first predetermined position is adjacent to or aligned with the second predetermined position to have a partial or complete overlap between an on-time from the leading edge to the trailing edge included in the detection signal from the first sensor and an on-time from the leading edge to the trailing edge included in the detection signal from the second sensor.

5. The control system according to claim 1, wherein the obtainer avoids obtaining the leading edge and the trailing edge included in the detection signal from the first sensor in response to the target device under the predetermined drive control turning back before passing the first predetermined position after the leading edge occurs in the detection signal from the first signal, and avoids obtaining the leading edge and the trailing edge included in the detection signal from the second sensor in response to the target device under the predetermined drive control turning back before passing the second predetermined position after the leading edge occurs in the detection signal from the second signal.

6. The control system according to claim 1, wherein the setting unit avoids setting the origin for the predetermined monitoring range when at least one of a first condition or a second condition is dissatisfied, the first condition is that a first confirmative distance calculated based on the leading edge included in the detection signal from the first sensor and the leading edge included in the detection signal from the second sensor is less than or equal to a predetermined first reference distance, and the second condition is that a second confirmative distance calculated based on the trailing edge included in the detection signal from the first sensor and the trailing edge included in the detection signal from the second sensor is less than or equal to a second reference distance.

7. A control system for monitoring a control state of a target device to receive drive control performed by a motor, the system comprising:

one or more processors configured to implement (i) a determination unit configured to calculate a position of the target device based on a signal from an encoder for the motor and determine whether the position of the target device is within a predetermined monitoring range, and (ii) a setting unit configured to set an origin for the predetermined monitoring range;

an interrupter configured to interrupt transmission of a drive signal to a driver, the drive signal being transmitted to supply a drive current from the driver to the motor;

a safety controller configured to interrupt the drive signal with the interrupter in response to the determination unit determining that the position of the target device deviates from the predetermined monitoring range; and at least one sensor configured to detect the target device driven by the motor reaching a predetermined position in a movable range of the target device, wherein the setting unit includes:

an obtainer configured to obtain, under predetermined drive control over the target device performed by the motor, a leading edge occurring in a detection signal in response to the target device moving toward the predetermined position and a trailing edge occurring in the detection signal in response to the target device moving away from the predetermined position, the detection signal being output from the at least one sensor in response to the target device reaching the predetermined position, and a calculator configured to calculate the origin using first position information and second position information, the first position information is associated with the position of the target device and calculated based on the leading edge and the trailing edge included in the detection signal, and the second position information is associated with the position of the target device and is different from the first position information, and wherein the at least one sensor is a first sensor configured to detect the target device reaching the predetermined position, the encoder stores the second position information, the obtainer obtains a leading edge and a trailing edge included in the detection signal from the first sensor, and the calculator calculates, in accordance with motion of the target device under the predetermined drive control, the first position information based on the leading edge and the trailing edge included in the detection signal from the first sensor, compares the first position information with the second position information, and calculates, based on a result of the comparison, a position indicated by the second position information as the origin.

8. The control system according to claim 7, wherein the target device is driven at a constant speed under the predetermined drive control, and the calculator calculates the first position information based on a midpoint between the leading edge and the trailing edge included in the detection signal from the first sensor.

9. The control system according to claim 7, wherein the obtainer avoids obtaining the leading edge and the trailing edge included in the detection signal from the first sensor in response to the target device under the predetermined drive control turning back before passing the predetermined position after the leading edge occurs in the detection signal from the first sensor.

* * * * *